UNITED STATES PATENT OFFICE 2,581,850

ADRENOCHROME COMPOSITIONS

Desider Fleischhacker, New York, and Norman Barsel, Laurelton, N. Y., assignors to International Hormones, Inc., Brooklyn, N. Y., a corporation of New York No Drawing. Application August 10, 1948, Serial No. 43,538

7 Claims. (Cl. 167—65)

Adrenochrome is an oxidation product of adrenalin and has the formula:

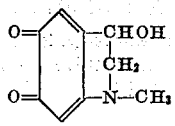

It may be prepared by oxidizing adrenaline in the presence of catechol-oxidase.

It may also be obtained by oxidation of adrenalin with the aid of silver oxide.

Adrenochrome is a very unstable product. It has been found, however, that certain derivatives of adrenochrome, particularly the monosemicarbazone and the mono-oxime, which may be prepared by treating adrenochrome for instance in aqueous or dilute alcoholic solution respectively with semicarbazide hydrochloride in the presence of sodium acetate and with hydroxylamine hydrochloride in the presence of sodium acetate.

These compounds have the formulae:

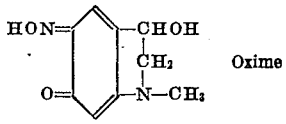 Oxime

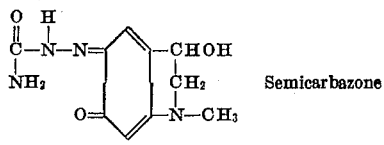 Semicarbazone

Both are very stable products in the dry form or in aqueous solutions. The aqueous solutions can be heated to boiling without decomposition. However, these derivatives are only very slightly soluble in water at 20° C.—about 0.05%—and therefore only very dilute solutions may be prepared. This is quite disadvantageous in the therapeutic use of these substances.

It now has been found that stable aqueous solutions of much higher concentrations of adrenochrome monosemicarbazone and mono-oxime, suitable for oral or parenteral administration, may be prepared by using sodium salicylate as a solubilizing agent.

It has further been found in accordance with the present invention that the combination of the above indicated adrenochrome derivatives and sodium salicylate form a particularly effective haemostatic composition and are especially effective in the prevention of bleeding and hemorrhages.

For instance 1.0 cc. of an aqueous solution of 500 grams sodium salicylate in 500 cc. of water, which has a total volume of about 800 cc., most readily dissolves 25 mg. of adrenochrome monosemicarbazone. This solution may be diluted to any degree with distilled water without any precipitation of the monosemicarbazone.

In this solution the ratio of sodium salicylate to the monosemicarbazone of adrenochrome is about 25:1 by weight.

In the same way a stable aqueous solution of the mono-oxime of adrenochrome can be prepared, the ratio of sodium salicylate to the mono-oxime being here about the same as for the monosemicarbazone.

The great advantage of the new preparations from a medicinal standpoint is that high concentrations of the monosemicarbazone or the mono-oxime of adrenochrome may be prepared in a small volume of liquid.

It is quite understood that higher proportions than 25:1 by weight, of sodium salicylate to the monosemicarbazone or the mono-oxime may also be employed. However lower proportions than 25:1, for example, 20:1 or even 15:1 also can be employed.

It is however, not advantageous to use proportions lower than 25:1, because of the possibility of crystallization on prolonged standing of such solutions below 10° C.

At a ratio of 25:1 the solutions may be diluted with water to any degree without precipitation, or they may be evaporated to dryness, preferably in vacuo at 50–60° C., without decomposition. At a ratio appreciably lower than 25:1 there is a tendency toward crystallization upon dilution of the solution on prolonged standing.

While we have given an example for the preparation of stable solutions of the monosemicarbazone and of the mono-oxime of adrenochrome with the aid of sodium salicylate it is understood that considerable modifications and variations may be made within the spirit of the invention and the scope of the claims.

Having thus described our invention what we claim as new and desire to secure by Letters Patent of the United States is:

1. A haemostatic composition comprising an aqueous solution of adrenochrome monosemicarbazone, suitable for medicinal use, containing in 1 cc. of solution more than 1 mg. adrenochrome monosemicarbazone and containing sodium salicylate as a solubilizing agent the ratio of the sodium salicylate and adrenochrome monosemicarbazone being at least 25:1.

2. A haemostatic composition comprising an aqueous solution of adrenochrome mono-oxime, suitable for medicinal use, containing in 1 cc. of solution more than 1 mg. adrenochrome monooxime and containing sodium salicylate as a solubilizing agent the ratio of the sodium salicylate and adrenochrome mono-oxime being at least 25:1.

3. A haemostatic composition comprising an aqueous solution of adrenochrome mono-oxime, suitable for medicinal use, containing sodium salicylate and adrenochrome mono-oxime in the ratio of at least 25:1 by weight.

4. A haemostatic composition comprising an aqueous solution of adrenochrome mono-semicarbazone, suitable for medicinal use, containing sodium salicylate and adrenochrome monosemicarbazone in the ratio of at least 25:1 by weight.

5. A haemostatic composition comprising sodium salicylate and the mono-oxime of adrenochrome in the ratio of at least 25:1 by weight.

6. A haemostatic composition comprising sodium salicylate and the monosemicarbazone of adrenochrome in the ratio of at least 25:1 by weight.

7. A haemostatic composition comprising sodium salicylate and an adrenochrome derivative in the ratio of at least 25:1 by weight, said adrenochrome derivative being selected from the group consisting of adrenochrome monosemicarbazone and adrenochrome mono-oxime.

DESIDER FLEISCHHACKER.
NORMAN BARSEL.

REFERENCES CITED

The following references are of record in the file of this patent:

UNITED STATES PATENTS

| Number | Name | Date |
|---|---|---|
| 868,204 | Mendel | Oct. 15, 1907 |
| 1,477,691 | Gallsen | Dec. 18, 1923 |
| 2,319,094 | Truebe | May 11, 1943 |
| 2,395,378 | Miller | Feb. 19, 1946 |
| 2,433,765 | Krantz | Dec. 30, 1947 |

FOREIGN PATENTS

| Number | Country | Date |
|---|---|---|
| 289,950 | Germany | Jan. 26, 1916 |

OTHER REFERENCES

Osol, U. S. Dispensatory, 24th Ed., 1947, p. 1092.
Derouaux et al., Squibb Abst. Bull., Dec. 19, 1945, p. A1557, vol. 18.